United States Patent
Watanabe

(10) Patent No.: US 8,462,708 B2
(45) Date of Patent: Jun. 11, 2013

(54) BASE STATION, WIRELESS CONTROL APPARATUS, AND WIRELESS APPARATUS

(75) Inventor: Teruyoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 12/488,698

(22) Filed: Jun. 22, 2009

(65) Prior Publication Data

US 2009/0252108 A1 Oct. 8, 2009

Related U.S. Application Data

(63) Continuation of application No. PCT/JP2007/055402, filed on Mar. 16, 2007.

(51) Int. Cl.
*H04W 4/00* (2009.01)
*H04M 1/00* (2006.01)

(52) U.S. Cl.
USPC ............................................. 370/329; 455/561

(58) Field of Classification Search
None
See application file for complete search history.

(56) References Cited

U.S. PATENT DOCUMENTS

| | | | | |
|---|---|---|---|---|
| 6,094,683 | A * | 7/2000 | Drottar et al. | 709/226 |
| 6,400,966 | B1 | 6/2002 | Andersson et al. | |
| 7,190,680 | B2 | 3/2007 | Lim | |
| 7,746,840 | B2 | 6/2010 | Lee | |
| 2006/0002294 | A1 * | 1/2006 | Chapman et al. | 370/229 |
| 2006/0215689 | A1 * | 9/2006 | Liu et al. | 370/465 |
| 2006/0291476 | A1 * | 12/2006 | Meir | 370/395.43 |
| 2008/0225816 | A1 | 9/2008 | Osterling et al. | |
| 2011/0032910 | A1 * | 2/2011 | Aarflot et al. | 370/335 |

FOREIGN PATENT DOCUMENTS

| | | |
|---|---|---|
| CN | 1922903 | 2/2007 |
| EP | 0996262 A1 | 4/2000 |
| EP | 1744572 A1 | 1/2007 |
| JP | 3-283725 | 12/1991 |
| JP | 8-251283 | 9/1996 |
| JP | 9-64809 | 3/1997 |
| JP | 2001-519635 | 10/2001 |
| JP | 2005-327302 | 11/2005 |
| JP | 2006-333504 | 12/2006 |
| KR | 2002-0053403 | 7/2002 |
| KR | 10-2006-0120115 | 11/2006 |
| WO | 97/38550 | 10/1997 |
| WO | 9859454 A2 | 12/1998 |
| WO | 2005/034544 | 4/2005 |
| WO | 2005048625 A1 | 5/2005 |
| WO | 2005/081563 | 9/2005 |
| WO | 2006/040653 | 4/2006 |

OTHER PUBLICATIONS

Chinese First Office Action dated Oct. 17, 2011, from corresponding Chinese Application No. 200780050003.4.
Korean Notice of Preliminary Rejection dated Jan. 12, 2011, from the corresponding Korean Application.

(Continued)

*Primary Examiner* — John Blanton
(74) *Attorney, Agent, or Firm* — Katten Muchin Rosenman LLP

(57) ABSTRACT

In a base station that performs internal data transfer based on the CPRI, a dividing part divides the data to be transferred into division data. A transfer part transfers the division data by using a plurality of CPRI links. A receiving part receives the division data transferred by the CPRI links. A restoring part restores the original data from the division data received by the receiving part.

8 Claims, 19 Drawing Sheets

OTHER PUBLICATIONS

Japanese Office Action dated Mar. 22, 2011, from the corresponding Japanese Application.
"CPRI Specification V2.0" http://www.cpri.info/jp/spec.html, Sep. 13, 2006.
Chinese 2nd Office Action dated Apr. 17, 2012, from corresponding Chinese Application No. 200780050003.4.
European Search Report dated Mar. 7, 2013 from the corresponding European Patent Application No. 07738847.8.

* cited by examiner

| CPRI LINK 31a | | | | | | |
|---|---|---|---|---|---|---|
| TYPE | X# | USE | X# | USE | X# | USE |
| Sync&Timing | 0 | Sync Byte K28.5 | 64 | Hyperframe Number (0~149) | 128 | BFN-low | 192 | BFN-high |
| slow C&M | 1 | HDLC Channel | 65 | HDLC Channel | 129 | HDLC Channel | 193 | HDLC Channel |
| L1 Inband Protocol | 2 | Protocol Version | 66 | Startup info(HDLC data rate) | 130 | Reset/Alarm | 194 | P: Subchannel Number Pointer (Start Position of Ethernet Link) |
| Reserved | 3 ~ 15 | | 67 ~ 79 | | 131 ~ 143 | | 195 ~ 207 | |
| Reserved | | | | | | | | |
| Vendor Specific | 16 | Inter-CPRI-Link Combination Target Information = A, B, C | 80 | Intra-CPRI-Link Combination Count = 3 | 144 | Z.21.0 | 208 | Z.23.0 |
| | ~ | Total Data Amount =7 * 15 bytes | ~ | Z.21.0 | ~ | | ~ | |
| Vendor Specific | 20 | Inter-CPRI-Link Combination Order Information = A, B, C | 83 | Z.22.0 | 148 | | 212 | |
| Fast C&M | 21 | | 84 | | 149 | | 213 | |
| | ~ | | ~ | | ~ | | ~ | |
| Fast C&M | 63 | | 127 | | 191 | | 255 | |

FIG. 3

CPRI LINK 31b

| TYPE | X# | USE | X# | USE | X# | USE | X# | USE |
|---|---|---|---|---|---|---|---|---|
| Sync&Timing | 0 | Sync Byte K28.5 | 64 | Hyperframe Number (0~149) | 128 | BFN-low | 192 | BFN-high |
| slow C&M | 1 | HDLC Channel | 65 | HDLC Channel | 129 | HDLC Channel | 193 | HDLC Channel |
| L1 Inband Protocol | 2 | Protocol Version | 66 | Startup info(HDLC data rate) | 130 | Reset/Alarm | 194 | P: Subchannel Number Pointer (Start Position of Ethernet Link) |
| Reserved | 3 ~ 15 |  | 67 ~ 79 |  | 131 ~ 143 |  | 195 ~ 207 |  |
| Reserved |  |  |  |  |  |  |  |  |
| Vendor Specific | 16 | Intra-CPRI-Link Combination Count = 2 | 80 |  | 144 |  | 208 |  |
|  | ~ 20 | Z.21.0 Z.22.0 | ~ 83 |  | ~ 148 |  | ~ 212 |  |
| Vendor Specific |  |  |  |  |  |  |  |  |
| Fast C&M | 21 |  | 84 |  | 149 |  | 213 |  |
|  | ~ |  | ~ |  | ~ |  | ~ |  |
| Fast C&M | 63 |  | 127 |  | 191 |  | 255 |  |

FIG. 4

| CPRI LINK 31c | | | | | | |
|---|---|---|---|---|---|---|
| TYPE | X# | USE | X# | USE | X# | USE |
| Sync&Timing | 0 | Sync Byte K28.5 | 64 | Hyperframe Number (0~149) | 128 | BFN-low | 192 | BFN-high |
| slow C&M | 1 | HDLC Channel | 65 | HDLC Channel | 129 | HDLC Channel | 193 | HDLC Channel |
| L1 Inband Protocol | 2 | Protocol Version | 66 | Startupinfo(HDLC data rate) | 130 | Reset/Alarm | 194 | P: Subchannel Number Pointer (Start Position of Ethernet Link) |
| Reserved | 3 | | 67 | | 131 | | 195 | |
| | ? | | ? | | ? | | ? | |
| Reserved | 15 | | 79 | | 143 | | 207 | |
| Vendor Specific | 16 | Intra-CPRI-Link Combination Count = 2 | 80 | | 144 | | 208 | |
| | ? | Z.21.0 | ? | | ? | | ? | |
| Vendor Specific | 20 | Z.22.0 | 83 | | 148 | | 212 | |
| Fast C&M | 21 | | 84 | | 149 | | 213 | |
| | ? | | ? | | ? | | ? | |
| Fast C&M | 63 | | 127 | | 191 | | 255 | |

FIG. 5

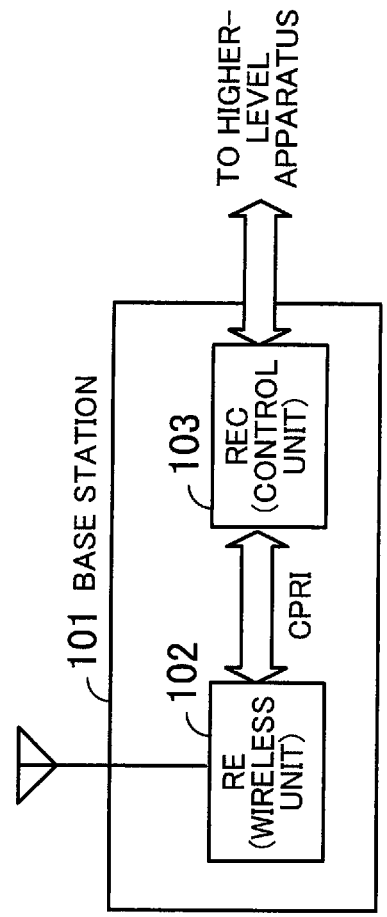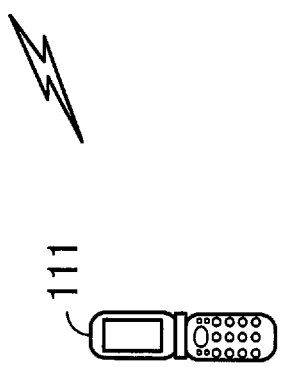
FIG. 10

| No. | LINE BIT RATE(MBIT/S) | POSSIBLE Y VALUES |
|---|---|---|
| 1 | 614.4 | Y0 |
| 2 | 1228.8 | Y0,Y1 |
| 3 | 2457.6 | Y0,Y1,Y2,Y3 |

FIG. 16

BASE STATION, WIRELESS CONTROL APPARATUS, AND WIRELESS APPARATUS

This application is a continuing application, filed under 35 U.S.C. §111(a), of International Application PCT/JP2007/055402, filed Mar. 16, 2007.

FIELD

The embodiments discussed herein are related to base stations, wireless control apparatuses, and wireless apparatuses.

BACKGROUND

The base station in wireless communication systems for mobile phones and the like can be separated into an RE (radio equipment) that handles radio signals and an REC (radio equipment control) that controls the RE. One interface that connects the REC and the RE is the CPRI (Common Public Radio Interface) (refer to non-patent literature 1: "CPRI Specification V2.0", online, obtained on Sep. 13, 2006 on the Internet at http//www.cpri.info/jp/spec.html).

With the separate RE and REC in the base station, the open interface CPRI allows components supplied from a variety of vendors to be used in the base station. The specified application range of the CPRI includes hardware layers L1 and L2.

FIG. 10 illustrates the CPRI of the base station. In FIG. 10, a base station 101 and a wireless terminal 111, which may be a mobile phone, for instance, are included.

The base station 101 can be separated into RE 102 and REC 103, as illustrated in FIG. 10. The RE 102 and the REC 103 are connected by the CPRI. By connecting the RE 102 and the REC 103 with the open CPRI, the base station 101 can include components supplied from a plurality of vendors.

FIG. 11 illustrates an outline of the CPRI protocol structure. The CPRI allows data exchange between the REC and the RE in accordance with the protocol structure as illustrated in FIG. 11. For example, "IQ Data" in FIG. 11 is user data of a digital base band signal. "SYNC" (synchronization) is a parameter for frame synchronization or time synchronization. "L1 Inband Protocol" is a link protocol used on a physical layer, and the protocol performs processing related to layer L1 at system startup or the like. "Control & Management Plane" is a protocol used for control management information transfer between the REC and the RE. "Vendor Specific" is a protocol used for vendor-specific information transfer, and this area can be used freely by the user.

FIG. 12 illustrates a first example of the CPRI frame structure. As illustrated in FIG. 12, the CPRI frame has a layered structure formed of basic frames, hyper frames, and a UMTS (Universal Mobile Telecommunications System) radio frame. A group of 256 basic frames forms a hyper frame, and a group of 150 hyper frames form the UMTS radio frame. The hyper frames are given indexes Z0 to Z149, and the basic frames are given indexes X0 to X255.

The basic frames form the basis of the CPRI frame structure, and the length of a single basic frame is defined as 1 Tc=1/3.84 MHz=260.416667 ns. A unit of the basic frame has sixteen 8-bit words, as illustrated in FIG. 12, and the basic frames are managed with values Y0 to Y3. The example illustrated in FIG. 12 uses Y0 (Y1 to Y3 will be described later).

The first byte of the basic frame is defined as a control word. The control word includes a hyper-frame index value, Z0 to Z149, a basic-frame index value, X0 to X255, and a basic-frame line number, Y0 to Y3.

The location of the basic frame in the UMTS radio frame can be indicated by a Z.X.Y (Z, X, and Y are positive integers) value specified in the control word. The Z.X.Y value can be understood as the address of the basic frame. In the subsequent description, the Z.X.Y value may be sometimes referred to as a control word address.

FIG. 13 illustrates the control word address. As illustrated in FIG. 13, the control word address indicating the location of each basic frame is placed in the control word (of the basic frame) in the hyper frame.

For example, suppose that the control word of a basic frame has 'Z.1.0' (Z is a given value). This indicates that the basic frame having the control word address 'Z.1.0' is placed in the hyper frame having the index 'Z' in the UMTS radio frame, and the basic frame has the index 'X1' and the line number 'Y0'.

FIG. 14 illustrates a second example of the CPRI frame structure. The CPRI frame illustrated in FIG. 14 differs from the CPRI frame illustrated in FIG. 12 in that there are two basic-frame line numbers, 'Y0' and 'Y1'. In the CPRI frame structure illustrated in FIG. 14, the control word address can have one of two Y values, '0' and '1'.

FIG. 15 illustrates a third example of the CPRI frame structure. The CPRI frame illustrated in FIG. 15 differs from the CPRI frame illustrated in FIG. 12 in that there are four basic-frame line numbers, 'Y0' to 'Y3'. In the CPRI frame structure illustrated in FIG. 15, the control word address can have one of four Y values, '0' to '3'.

FIG. 16 illustrates a CPRI line bit rate. The CPRI line bit rate depends on the Y value of the line number. As indicated in FIG. 16, if a single Y value 'Y0' is possible, the line bit rate is 614.4 Mbps. If two Y values 'Y0' and 'Y1' are possible, the line bit rate is 1228.8 Mbps. If four Y values 'Y0' to 'Y3' are possible, the line bit rate is 2457.6 Mbps.

In the example of the CPRI frame structure illustrated in FIG. 12, the line bit rate is 614.4 Mbps. The example of the CPRI frame structure illustrated in FIG. 14 has double data in the basic frame, and the line bit rate becomes two times 614.4 Mbps, which is 1228.8 Mbps. The example of the CPRI frame structure illustrated in FIG. 15 has quadruple data in the basic frame, and the line bit rate becomes four times 614.4 Mbps, which is 2457.6 Mbps.

The 256 control words in each hyper frame form a single group, and the location of each control word (among the 256 control words) determines its use.

FIG. 17 illustrates control word mapping. CPRI protocols are allocated to each hyper frame as illustrated in FIG. 17.

For example, the basic frames having control word addresses 'Z.0.0', 'Z.64.0', 'Z.128.0', and 'Z.192.0' are assigned a Sync & Timing protocol. In the corresponding locations, predetermined information about the Sync & Timing protocol is placed. The basic frames having control word addresses 'Z.2.0', 'Z.66.0', 'Z.130.0', 'Z.194.0' are assigned the L1 inband protocol. In the corresponding locations, predetermined information about the L1 inband protocol is placed.

The control words in a single hyper frame form a single group. The CPRI protocol structure can be recognized only after the entire 256 control words are received.

"Sync & Timing" in FIG. 17 corresponds to "SYNC" and "Time Division Multiplexing" in FIG. 11. "L1 Inband Protocol" in FIG. 17 corresponds to "L1 Inband Protocol" in FIG. 11. "Vendor Specific" in FIG. 17 corresponds to "Vendor Specific" in FIG. 11. "Slow C&M" and "Fast C&M" in FIG. 17 correspond to "Control & Management Plane" in FIG. 11.

In the mapping in FIG. 17, the CPRI line bit rate is 614.4 Mbps, that is, there is one line number 'Y0'. Even if the line bit rate is different, the control words of a single hyper frame form a group and are assigned the CPRI protocols.

Sectors and cells for the base station will be described next.

FIG. 18 illustrates the sectors and cells for the base station. As given in FIG. 18, the area in which the base station performs wireless communication with a wireless terminal is divided into sectors A to C. Each sector is divided into carriers f1 to f3.

A cell D is identified by a combination of the sector, A to C, and the carrier, f1 to f3. The example illustrated in FIG. 18 has nine cells D.

A single CPRI sector is assigned a single CPRI link. Therefore, the CPRI link will not be used to transfer the data of a different sector.

FIG. 19 illustrates the relationship between the sectors and the CPRI links. FIG. 19 illustrates the RE 102 and the REC 103 given in FIG. 10. As illustrated in FIG. 19, the RE 102 and the REC 103 are connected by n CPRI links 121a, 121b, 121c, . . . , and 121n.

The CPRI transfers data with a single sector assigned to a single CPRI link. For instance, sector A in FIG. 18 is assigned to the CPRI link 121a in data transfer; sector B is assigned to the CPRI link 121b in data transfer; sector C is assigned the CPRI link 121c in data transfer.

In short, a single CPRI link can transfer the data of a plurality of cells. A data transfer rate of up to 2457.6 Mbps is possible per CPRI link. However, as described above, the CPRI link may not transfer the data of another sector. In the example given above, the data of sector A may not be transferred by the CPRI link 121b or 121c.

In the CPRI, the CPRI link may not transfer the data of a different sector. If data is concentrated on a single CPRI link, the concentrated data may not be distributed to another CPRI link even if the link has a room.

Accordingly, the REC-RE data transfer capability depends on the maximum data transfer capability of the single CPRI link and may not meet the demands of greater transfer capabilities.

SUMMARY

According to an aspect of the embodiment, a base station that performs internal data transfer through a plurality of links based on a common interface includes: a dividing part that divides data to be transferred into division data; a transfer part that transfers the division data by using the plurality of links; a receiving part that receives the division data transferred by the plurality of links; and a restoring part that restores the original data from the received division data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates mapping of common control information and individual control information;

FIG. 4 is a first diagram illustrating the mapping of the individual control information;

FIG. 5 is a second diagram illustrating the mapping of the individual control information;

FIG. 10 illustrates a CPRI of the base station;

FIG. 16 illustrates a CPRI line bit rate;

DESCRIPTION OF EMBODIMENT(S)

Figure 1:
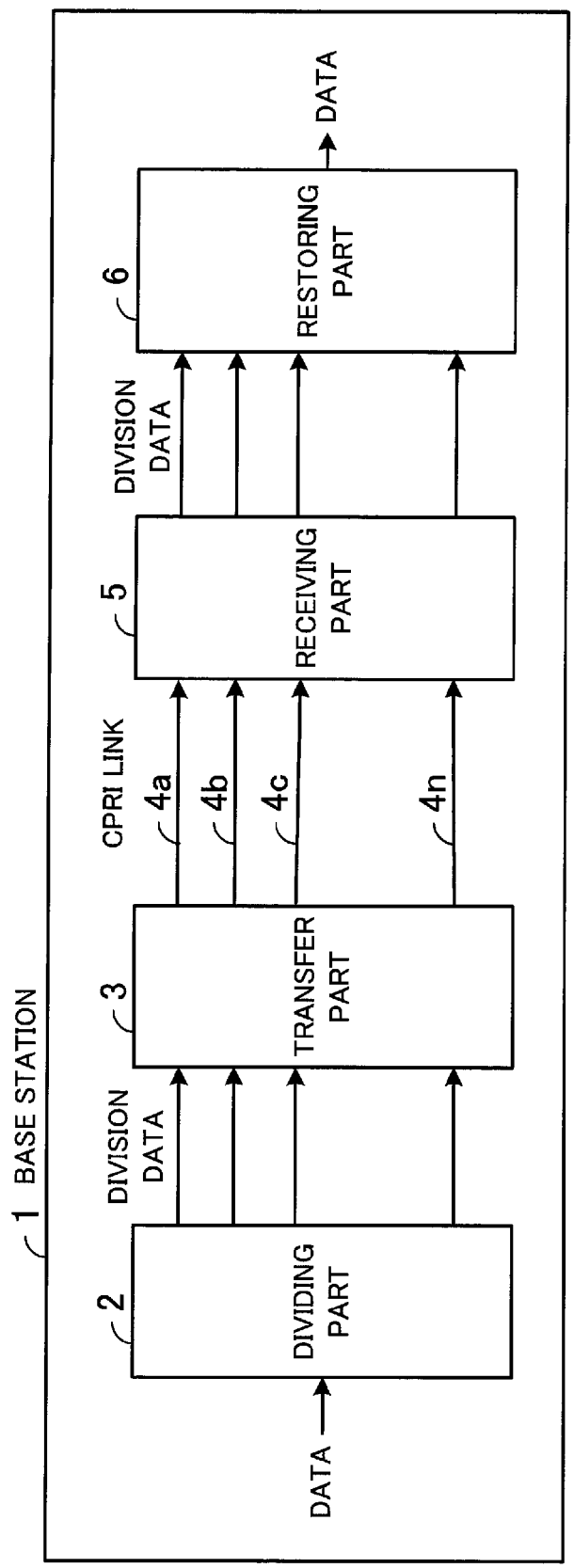
FIG. 1 illustrates an outline of a base station.

An embodiment of the present invention will be described below with reference to the accompanying drawings, wherein like reference numerals refer to like elements throughout.

FIG. 1 illustrates an outline of a base station. A base station 1 in FIG. 1 performs internal data transfer based on the CPRI. The base station 1 includes a dividing part 2, a transfer part 3, CPRI links 4a to 4n, a receiving part 5, and a restoring part 6.

The dividing part 2 divides the data to be transferred into division data.

The transfer part 3 transfers the division data by using the plurality of CPRI links 4a to 4n. For example, three CPRI links 4a to 4c are used for the data transfer. Alternatively, n CPRI links 4a to 4n are used for the data transfer.

The receiving part 5 receives the division data transferred by the CPRI links 4a to 4n.

The restoring part 6 restores the original data from the division data received by the receiving part 5. In other words, the data that have been input to the dividing part 2 is restored.

In the base station 1, the data to be transferred by the CPRI is divided into division data, and the division data is transferred by the CPRI links 4a to 4n. After being transferred, the original data is restored from the division data.

If data is concentrated on any of the CPRI links 4a to 4n, the data is distributed to the CPRI links 4a to 4n when the data is transferred. Accordingly, the data transfer efficiency can be improved.

Embodiments of the present invention will be described in detail with reference to the drawings.

Figure 2:
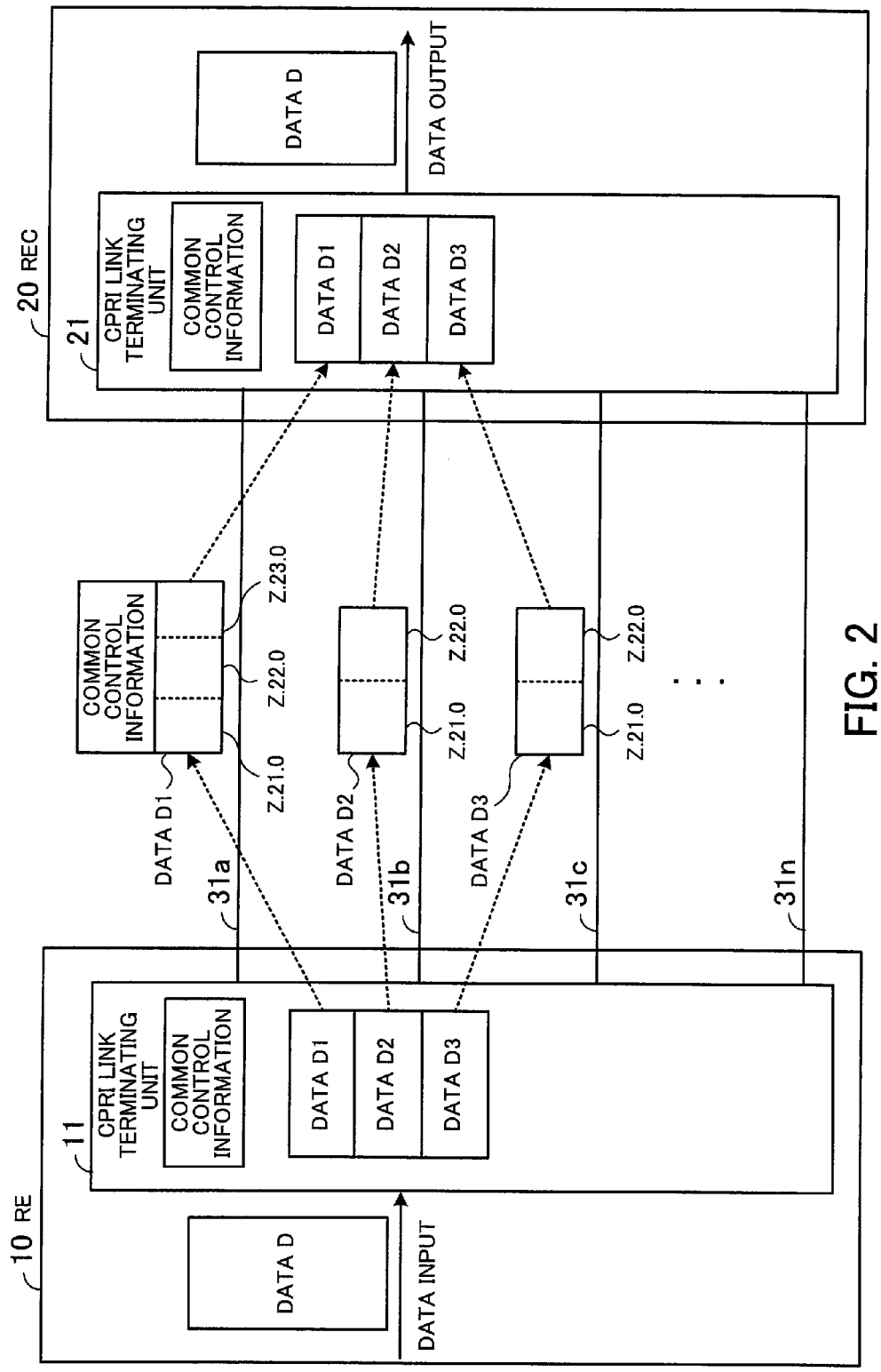
FIG. 2 is a block diagram illustrating an RE and REC in a base station.

FIG. 2 is a block diagram illustrating an RE and REC in a base station. The base station in FIG. 2 performs wireless communication with wireless terminals such as mobile phones in accordance with the 3GPP (Third Generation Partnership Project) standard, for instance. The base station is separated into the RE 10 and the REC 20, as illustrated in FIG. 2. The RE 10 has a CPRI link terminating unit 11, and the REC 20 has a CPRI link terminating unit 21.

The CPRI link terminating units 11 and 21 are connected by N CPRI links 31a, 31b, 31c, . . . , and 31n. The RE 10 and the REC 20 exchange data through the CPRI links 31a, 31b, 31c, . . . , and 31n.

The data to be transferred to the REC 20 is input to the CPRI link terminating unit 11. The CPRI link terminating unit 11 divides the input data and transfers the data by the CPRI links 31a, 31b, 31c, ... and 31n in a distributed manner.

In the example illustrated in FIG. 2, the CPRI link terminating unit 11 divides the data D to be transferred into three parts D1 to D3. The CPRI link terminating unit 11 transfers the division data D1 by the CPRI link 31a, the division data D2 by the CPRI link 31b, the division data D3 by the CPRI link 31c.

The CPRI link terminating unit 11 generates common control information concerning the entire data division for the CPRI links 31a, 31b, 31c, ... , and 31n. The CPRI link terminating unit 11 also generates individual control information (not illustrated) concerning data division for each of the CPRI links 31a, 31b, 31c, ... , and 31n. The common control information is transferred to the CPRI link terminating unit 21 through one of the N CPRI links 31a, 31b, 31c, ... , and 31n whereas the individual control information is transferred by using the corresponding CPRI link 31a, 31b, 31c, ... , or 31n that transfers the corresponding division data.

In the example in FIG. 2, the common control information is transferred to the CPRI link terminating unit 21 by using the CPRI link 31a. The individual control information is transferred by the corresponding CPRI link 31a, 31b, or 31c that transfers the corresponding division data.

The common control information includes an item indicating which of the CPRI links 31a, 31b, 31c, ... , and 31n is used to transfer the division data, an item indicating the total amount of data to be transferred, and an item indicating the order in which the division data transferred by the CPRI links 31a, 31b, 31c, ... , and 31n is combined.

Suppose that the total amount of data D to be transferred in the example illustrated in FIG. 2 is 105 bytes (7×15 bytes). Let the division data D1 to D3 be transferred by the CPRI links 31a, 31b, and 31c. The common control information here includes an item indicating that the division data D1 to D3 is transferred by the CPRI links 31a, 31b, and 31c. An item indicating that the total amount of data D to be transferred is 7×15 bytes is also included. An item indicating that the division data D1 to D3 transferred by the CPRI links 31a, 31b, and 31c is combined in that order is further included.

The individual control information includes an item indicating the number of division data parts to be connected in each CPRI link and an item indicating the basic frame used to transfer the data in the CPRI link.

Suppose that the division data D1 is transferred in the CPRI link 31a by the basic frames having control word addresses 'Z.21.0', 'Z.22.0', and 'Z.23.0', in the example in FIG. 2. This means that the data D1 is divided further into three parts and transferred by the basic frames. Then, the individual control information of the CPRI link 31a includes '3' as an item indicating the number of data parts to be combined. The control word addresses 'Z.21.0', 'Z.22.0', and 'Z.23.0' are included as items indicating the basic frames that are used to transfer the data.

Suppose that the data D2 is transferred by the basic frames having control word addresses 'Z.21.0' and 'Z.22.0' in the CPRI link 31b. This means that the data D2 is divided further into two parts and transferred by the basic frames. Then, the individual control information of the CPRI link 31b includes '2' as an item indicating the number of data parts to be combined. The control word addresses 'Z.21.0' and 'Z.22.0' are included as information indicating the basic frames that are used to transfer the data.

Suppose that the data D3 is transferred by the basic frames having control word addresses 'Z.21.0' and 'Z.22.0' in the CPRI link 31c. This means that the data D3 is divided further into two parts and transferred by the basic frames. Then, the individual control information of the CPRI link 31c includes '2' as information indicating the number of data parts to be combined. The control word addresses 'Z.21.0' and 'Z.22.0' are also included as information indicating the basic frames that are used to transfer the data.

The basic frame has sixteen 8-bit words, or sixteen bytes. One byte is used as a control word. The total amount of the data D1 to D3 that can be transferred by the seven control word addresses given above is 7×15 bytes. This value equals to the total amount of data included in the common control information.

The CPRI link terminating unit 21 restores the original data from the division data by using the common control information and individual control information transferred from the CPRI link terminating unit 11.

In the example in FIG. 2, the common control information received by the CPRI link terminating unit 21 includes the information indicating that the division data D1 to D3 is transferred by using the CPRI links 31a, 31b, and 31c. Therefore, the CPRI link terminating unit 21 can recognize that the data received from the CPRI links 31a, 31b, and 31c need to be combined. According to the individual control information received from the CPRI links 31a, 31b, and 31c, the CPRI link terminating unit 21 can recognize the basic frames that are used to transfer data in the CPRI links 31a, 31b, and 31c.

The CPRI link terminating unit 21 further recognizes from the individual information that the data D1 is transferred by the basic frames having control word addresses 'Z.21.0', 'Z.22.0', and 'Z.23.0' in the CPRI link 31a. The CPRI link terminating unit 21 also recognizes that the data D2 is transferred by the basic frames having control word addresses 'Z.21.0' and 'Z.22.0' in the CPRI link 31b and that the data D3 is transferred by the basic frames having control word addresses 'Z.21.0' and 'Z.22.0' in the CPRI link 31c. According to that information, the division data D1, D2, and D3 can be restored in the CPRI links 31a, 31b, and 31c.

Suppose that the data is divided and stored in ascending order of control word addresses in each CPRI link. For example, in the CPRI link 31a, the division data D1 can be restored by combining the data of the basic frames having the control word addresses 'Z.21.0', 'Z.22.0', and 'Z.23.0' in that order.

In accordance with the common control information, the CPRI link terminating unit 21 can recognize that the division data D1, D2, and D3 need to be combined in that order, and restores the original data D by combining the division data D1, D2, and D3 in that order. Because the common control information indicates the total amount of data D to be transferred, the CPRI link terminating unit 21 can also determine whether the data D has been received appropriately.

The RE 10 and the REC 20 of the base station can divide data and transfer the data by the plurality of CPRI links 31a, 31b, 31c, ... , and 31n in a distributed manner, as described above.

In the description given above, the data is transferred from the RE 10 to the REC 20. Data can also be transferred from the REC 20 to the RE 10 in the same manner. In other words, the CPRI link terminating unit 21 has the functions provided by the CPRI link terminating unit 11, and the CPRI link terminating unit 11 has the functions provided by the CPRI link terminating unit 21.

How the division data, the common control information, and the individual control information are mapped in each CPRI frame and transferred will be described with reference to FIG. 3.

FIG. 3 illustrates mapping of the common control information and the individual control information. The CPRI mapping in FIG. 3 illustrates an example of mapping in a CPRI frame to be transferred by the CPRI link 31*a* in FIG. 2.

Vendor-specific areas in the CPRI frame can be used freely by the user. In the vendor-specific areas of the CPRI frame, the common control information and the individual control information are placed.

Placed in the vendor-specific areas of the CPRI frame are inter-CPRI-link combination target information, the total data amount, and inter-CPRI-link combination order information, for instance. The inter-CPRI-link combination target information, total data amount, and inter-CPRI-link combination order information are elements of the common control information. The inter-CPRI-link combination target information indicates the CPRI link that is used to transfer the division data; the total data amount indicates the total amount of data to be transferred; and the inter-CPRI-link combination order information indicates the order in which the division data that is transferred by the CPRI link is combined. As described with reference to FIG. 2, the inter-CPRI-link combination target information in FIG. 3 indicates the CPRI link 31*a* (A in FIG. 3), the CPRI link 31*b* (B in FIG. 3), and the CPRI link 31*c* (C in FIG. 3). The total data amount is 7×15 bytes. The inter-CPRI-link combination order information indicates the order of A, B, and C.

In the vendor-specific areas of the CPRI frame, an intra-CPRI-link combination count and control word addresses are also placed. The intra-CPRI-link combination count and the control word addresses are elements of the individual control information. The intra-CPRI-link combination count indicates the number of data parts to be combined in each CPRI link; and the control word address identifies the basic frame that is used to transfer the data in the CPRI link. In FIG. 3, the intra-CPRI-link combination count is '3', as in the example illustrated in FIG. 2. The control word addresses are 'Z.21.0', 'Z.22.0', and 'Z.23.0'. The basic frames having the control word addresses 'Z.21.0', 'Z.22.0', and 'Z.23.0' in the CPRI frame given in FIG. 3 have 15 bytes each of the division data D1.

In FIG. 3, the control word addresses 'Z.21.0', 'Z.22.0', and 'Z.23.0' indicate the fast C&M area, but a different area may be indicated. In other words, the division data D1 may be placed in a different area.

The division data D1 may be placed in another hyper frame. This means that the Z value of the control word address may be different.

FIG. 4 is a first diagram illustrating the mapping of the individual control information. The CPRI frame structure illustrated in FIG. 4 is an example of mapping of the CPRI frame to be transferred by the CPRI link 31*b* in FIG. 2. Therefore, just the individual control information is mapped in FIG. 4.

As illustrated in FIG. 4, the intra-CPRI-link combination count and the control word addresses are placed in vendor-specific areas of the CPRI frame. According to the example described with reference to FIG. 2, the intra-CPRI-link combination count is '2'. The division data D2 is placed in the basic frames having control word addresses 'Z.21.0' and 'Z.22.0'.

In FIG. 4, the control word addresses 'Z.21.0' and 'Z.22.0' indicate the fast C&M area, but another area may be indicated. In other words, the division data D2 may be placed in a different area.

The division data D2 may be placed in another hyper frame. This means that the Z value of the control word address may be different.

FIG. 5 is a second diagram illustrating the mapping of the individual control information. The CPRI frame structure illustrated in FIG. 5 is an example of mapping of the CPRI frame to be transferred by the CPRI link 31*c* in FIG. 2. Therefore, just the individual control information is mapped in FIG. 5.

As illustrated in FIG. 5, the intra-CPRI-link combination count and the control word addresses are placed in vendor-specific areas of the CPRI frame. According to the example described with reference to FIG. 2, the intra-CPRI-link combination count is '2'. The division data D3 is placed in the basic frames having the control word addresses 'Z.21.0' and 'Z.22.0'.

In FIG. 5, the control word addresses 'Z.21.0' and 'Z.22.0' indicate the fast C&M area, but another area may be indicated. In other words, the division data D3 may be placed in a different area.

The division data D3 may be placed in another hyper frame. This means that the Z value of the control word address may be different.

Data combination will be described with reference to FIG. 6.

Figure 6:
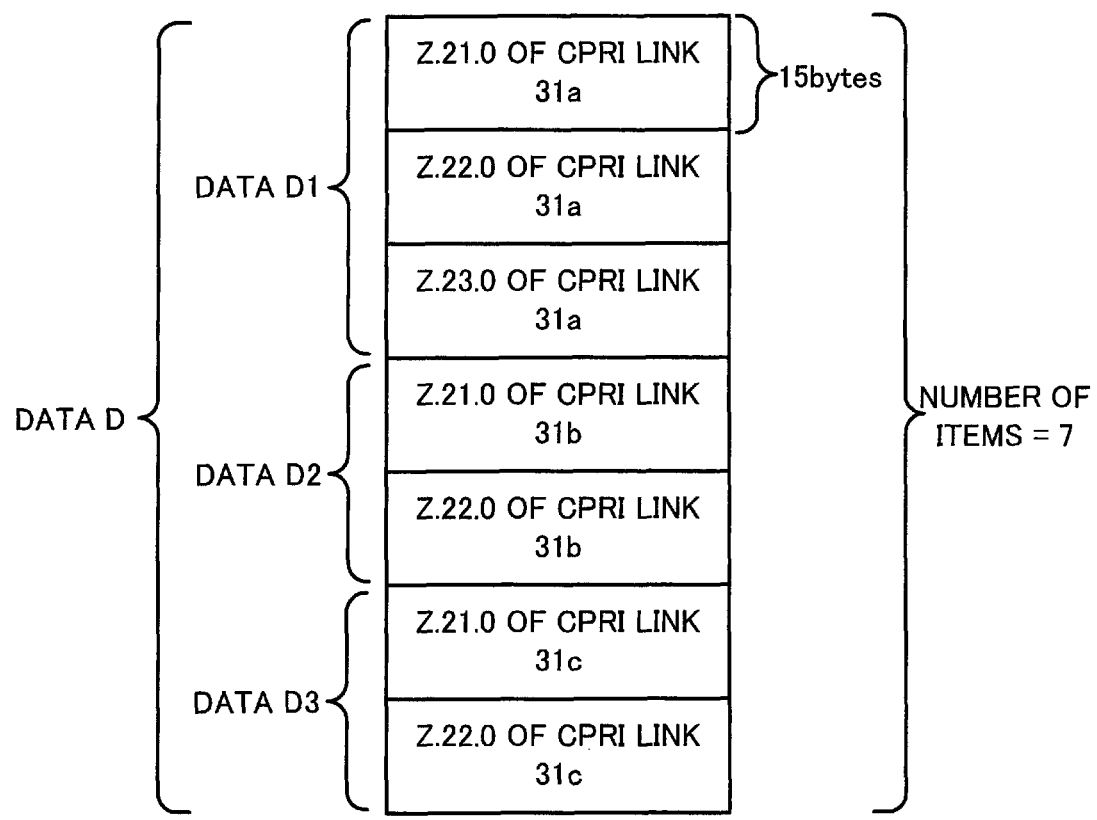
FIG. 6 illustrates restored data.

FIG. 6 illustrates restored data. The CPRI link terminating unit 21 in FIG. 2 extracts data from the CPRI frame and restores the data D, in accordance with the common control information placed in the CPRI frame received by the CPRI link 31*a* and the individual control information placed in the CPRI frames received by the CPRI links 31*a*, 31*b*, and 31*c*.

The CPRI link terminating unit 21 receives the CPRI frame mapped as illustrated in FIG. 3, from the CPRI link 31*a*. From the common control information of the received CPRI frame, the CPRI link terminating unit 21 recognizes that the data of the CPRI links 31*a*, 31*b*, and 31*c* need to be combined. The CPRI link terminating unit 21 also recognizes the total data amount of 7×15 bytes. The CPRI link terminating unit 21 further recognizes that the data of the CPRI links 31*a*, 31*b*, and 31*c* need to be combined in that order.

From the individual control information of the CPRI frame received from the CPRI link 31*a*, the CPRI link terminating unit 21 recognizes that the data combination count in the CPRI link 31*a* is '3'. The CPRI link terminating unit 21 also recognizes that the target data is placed in the frames having the control word addresses 'Z.21.0' and 'Z.22.0'. Therefore, the CPRI link terminating unit 21 can restore the division data D1 as illustrated in FIG. 6.

The CPRI link terminating unit 21 receives the CPRI frame mapped as illustrated in FIG. 4, from the CPRI link 31*b*. From the individual control information of the received CPRI frame, the CPRI link terminating unit 21 recognizes that the data combination count in the CPRI link 31*b* is '2'. The CPRI link terminating unit 21 also recognizes that the target data is placed in frames having the control word addresses 'Z.21.0' and 'Z.22.0'. Therefore, the CPRI link terminating unit 21 can restore the division data D2 as illustrated in FIG. 6.

The CPRI link terminating unit 21 receives the CPRI frame mapped as illustrated in FIG. 5, from the CPRI link 31*c*. From the individual control information of the received CPRI frame, the CPRI link terminating unit 21 recognizes that the data combination count in the CPRI link 31*c* is '2'. The CPRI link terminating unit 21 also recognizes that the target data is placed in the frames having the control word addresses 'Z.21.0' and 'Z.22.0'. Therefore, the CPRI link terminating unit 21 can restore the division data D3, as illustrated in FIG. 6.

The CPRI link terminating unit 21 then restores the data D by combining the division data D1, D2, and D3 in accordance with the data combination order (in the order of CPRI links 31*a*, 31*b*, and 31*c*) included in the common control information.

The RE 10 in FIG. 2 includes a wireless transmitter and a wireless receiver, and the REC 20 includes a call control unit.

Figure 7:
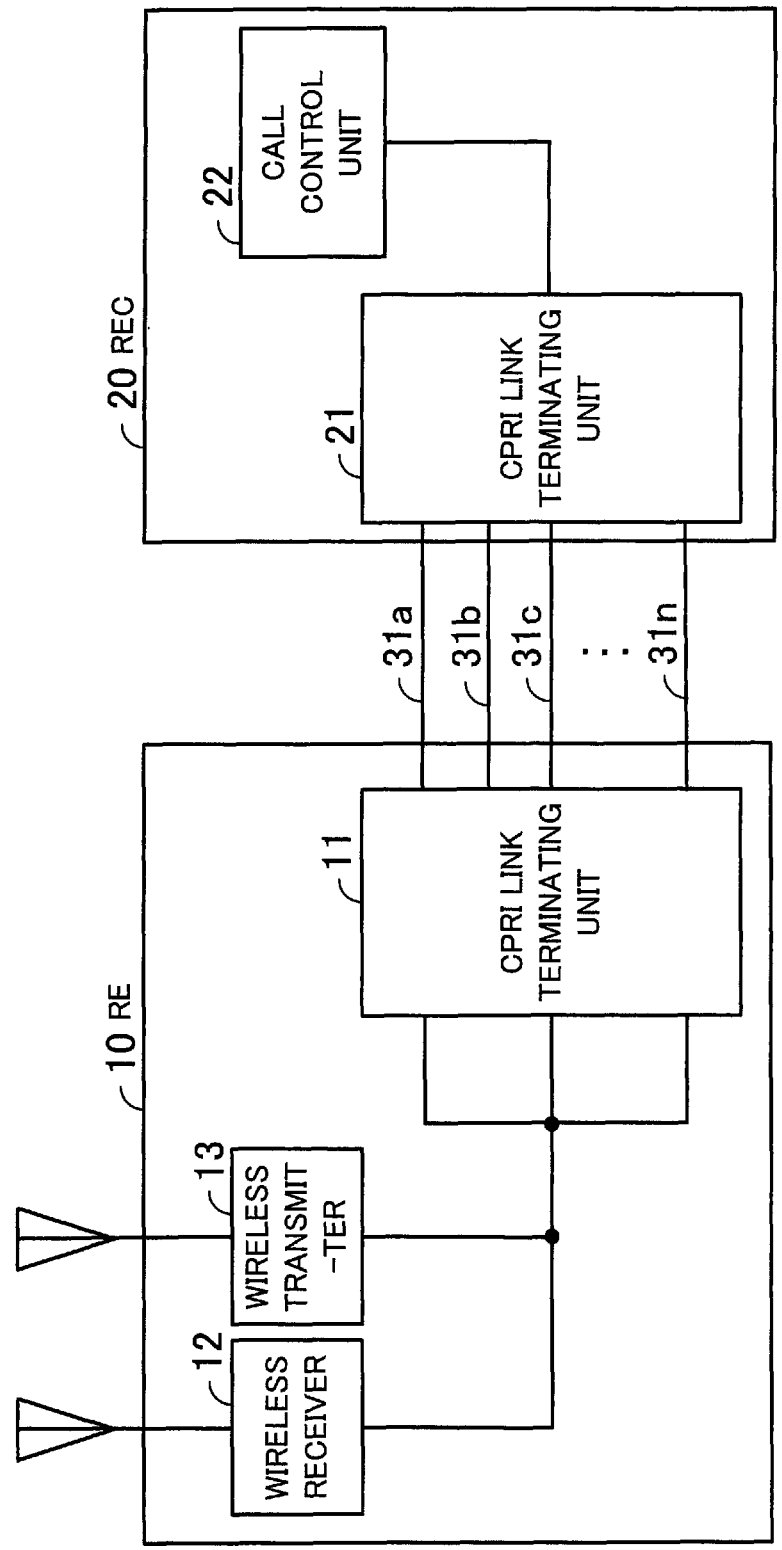
FIG. 7 is a block diagram that also includes a wireless transmitter, a wireless receiver, and a call control unit.

FIG. 7 is a block diagram that also includes the wireless transmitter, the wireless receiver, and the call control unit. In FIG. 7, elements identical to those in FIG. 2 are given the same reference symbols, and a description of those elements will be omitted.

The wireless receiver 12 receives data transmitted by radio from a wireless terminal such as a mobile phone. The wireless receiver 12 outputs the received data to the CPRI link terminating unit 11.

The wireless transmitter 13 sends data output from the CPRI link terminating unit 11 to a wireless terminal such as a mobile phone, by radio.

The CPRI link terminating unit 11 transfers the data received by the wireless receiver 12 to the CPRI link terminating unit 21 in the REC 20, in accordance with the CPRI. The CPRI link terminating unit 21 outputs the data received from the CPRI link terminating unit 11 to the call control unit 22. The call control unit 22 performs call processing or the like in accordance with the received data.

Data output from the call control unit 22 is transferred through the CPRI link terminating unit 21 to the CPRI link terminating unit 11 of the RE 10. The CPRI link terminating unit 11 outputs the received data to the wireless transmitter 13. The wireless transmitter 13 sends the received data to a wireless terminal by radio.

The operation of the base station will be described with reference to flowcharts.

Figure 8:
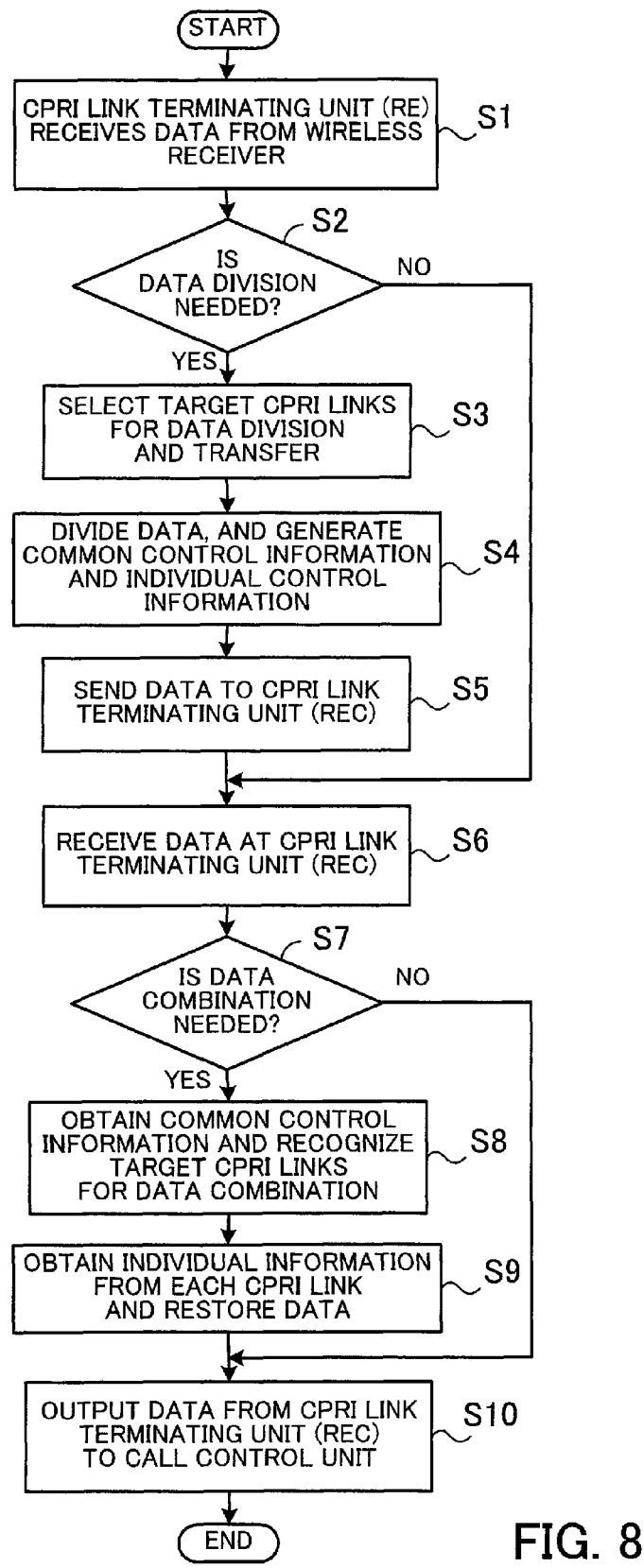
FIG. 8 is a flowchart illustrating the operation of the base station for upstream data.

FIG. 8 is a flowchart illustrating the operation of the base station for upstream data. The base station transfers the upstream data received by the wireless receiver 12 to the call control unit 22 in the following procedure.

In step S1, the CPRI link terminating unit 11 of the RE 10 receives the data from the wireless receiver 12.

In step S2, the CPRI link terminating unit 11 judges whether the data received from the wireless receiver 12 need to be divided. For example, the CPRI link terminating unit 11 may determine whether the data need to be divided, by comparing the size of the received data with a given threshold. The threshold can be the amount of data that can be transferred by a single CPRI link, for instance. If the CPRI link terminating unit 11 determines that the data need to be divided, the processing goes to step S3. Otherwise, the processing goes to step S6. Whether the data need to be divided may be specified beforehand in a fixed manner by the operator.

In step S3, the CPRI link terminating unit 11 selects a CPRI link 31*a*, 31*b*, 31*c*, . . . , or 31*n* that is used to transfer the division data. For example, the CPRI link terminating unit 11 may select a predetermined CPRI link 31*a*, 31*b*, 31*c*, . . . , or 31*n* or may select all the CPRI links 31*a*, 31*b*, 31*c*, . . . , and 31*n*. Alternatively, the CPRI link terminating unit 11 may select a given number of CPRI links having a small transfer amount among the CPRI links 31*a*, 31*b*, 31*c*, . . . , and 31*n*. The operator can specify a desired CPRI link selection method.

The CPRI link terminating unit 11 selects one of the CPRI links 31*a*, 31*b*, 31*c*, . . . , and 31*n* to transfer the common control information. The CPRI link 31*a*, 31*b*, 31*c*, . . . , or 31*n* can be predetermined or can be selected at random.

In step S4, the CPRI link terminating unit 11 divides the data. The CPRI link terminating unit 11 divides the data by the number of CPRI links 31*a*, 31*b*, 31*c*, . . . , and 31*n* selected in step S3. If three CPRI links 31*a*, 31*b*, and 31*c* are selected, the data is divided into three parts. The CPRI link terminating unit 11 generates common control information and individual control information.

In step S5, the CPRI link terminating unit 11 transfers the division data, the common control information, and the individual control information by using the CPRI links 31*a*, 31*b*, 31*c*, . . . , and 31*n* selected in step S3. The CPRI link terminating unit 11 transfers the CPRI frame with the common control information and the individual control information placed in vendor-specific areas.

In step S6, the CPRI link terminating unit 21 of the REC 20 receives the data transferred from the CPRI link terminating unit 11.

In step S7, the CPRI link terminating unit 21 determines whether the data needs to be combined. The CPRI link terminating unit 21 determines the necessity to combine the data, depending on whether the common control information is specified in a vendor-specific area of the CPRI frame. If it is determined that the data need to be combined, the procedure goes to step S8. Otherwise, the procedure goes to step S10.

In step S8, the CPRI link terminating unit 21 obtains the common control information from the vendor-specific areas of the CPRI frame and recognizes the target CPRI links 31*a*, 31*b*, 31*c*, . . . , and 31*n* for data combination.

In step S9, the CPRI link terminating unit 21 obtains the individual control information from the CPRI links 31*a*, 31*b*, 31*c*, . . . , and 31*n* recognized in step S8. The CPRI link terminating unit 21 restores the original data by combining the division data in accordance with the common control information and the individual control information.

In step S10, the CPRI link terminating unit 21 outputs the restored data to the call control unit 22.

Figure 9:
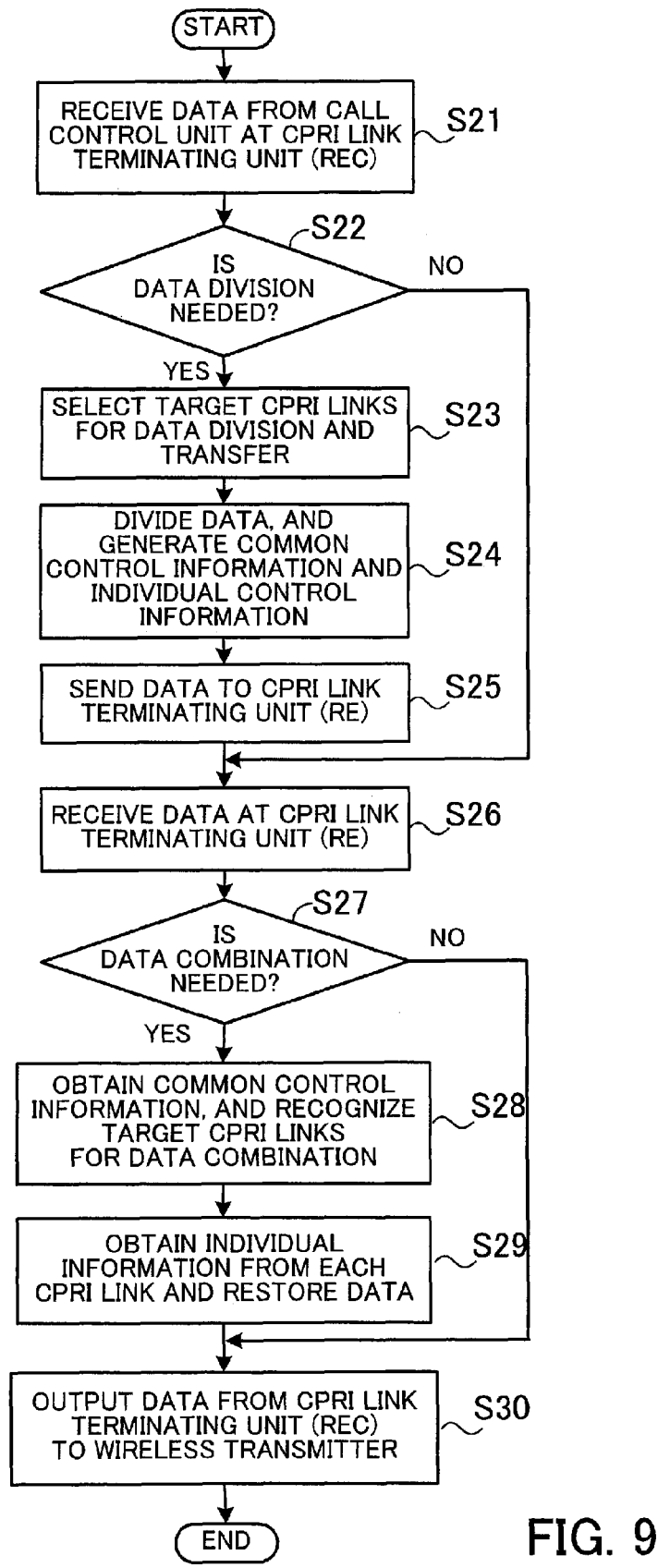
FIG. 9 is a flowchart illustrating the operation of the base station for downstream data.
Figure 11:
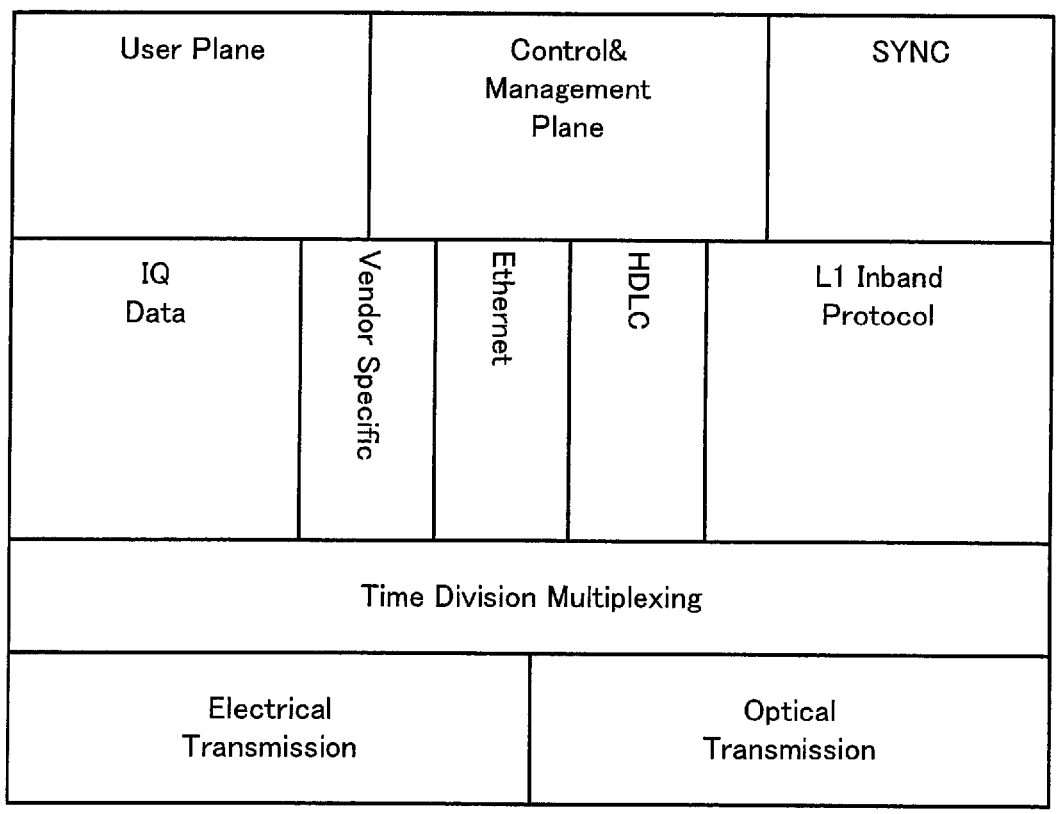
FIG. 11 illustrates an outline of a CPRI protocol structure.
Figure 12:
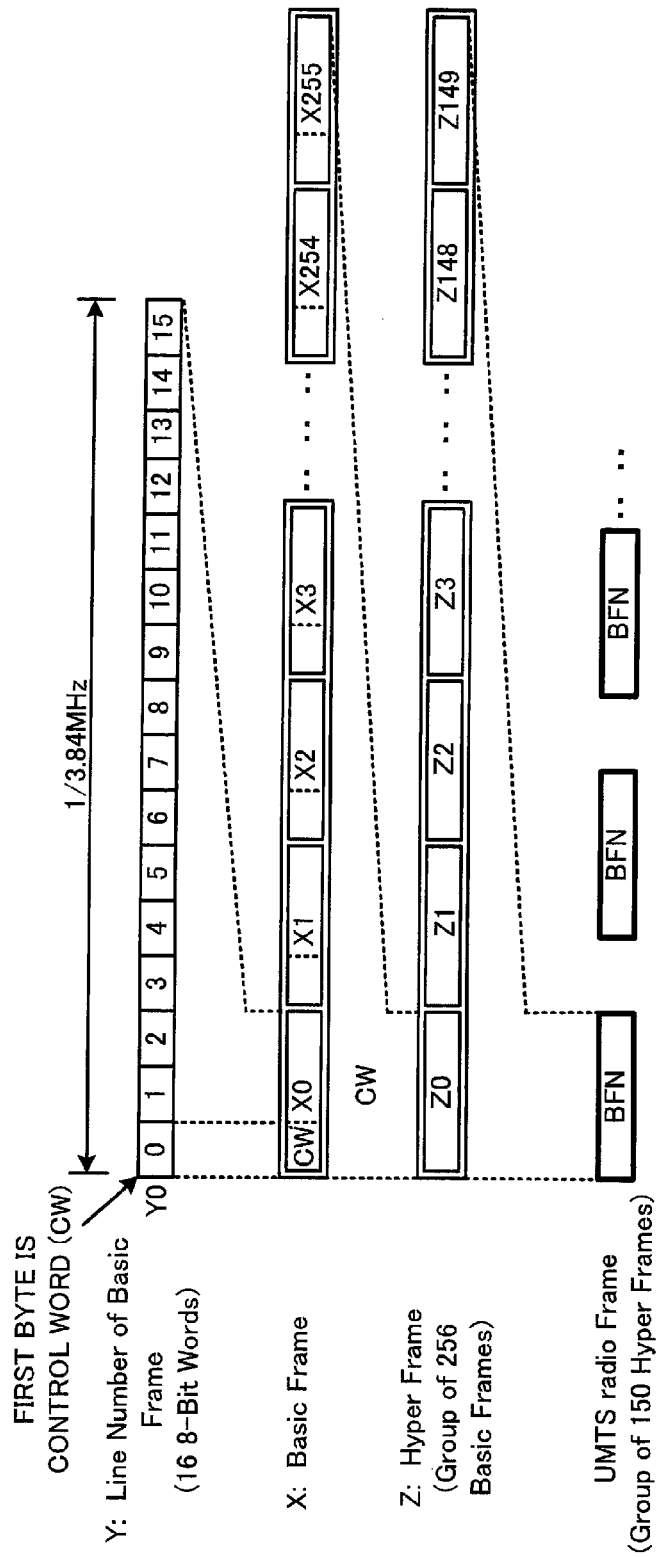
FIG. 12 illustrates a first example of a CPRI frame structure.
Figure 13:
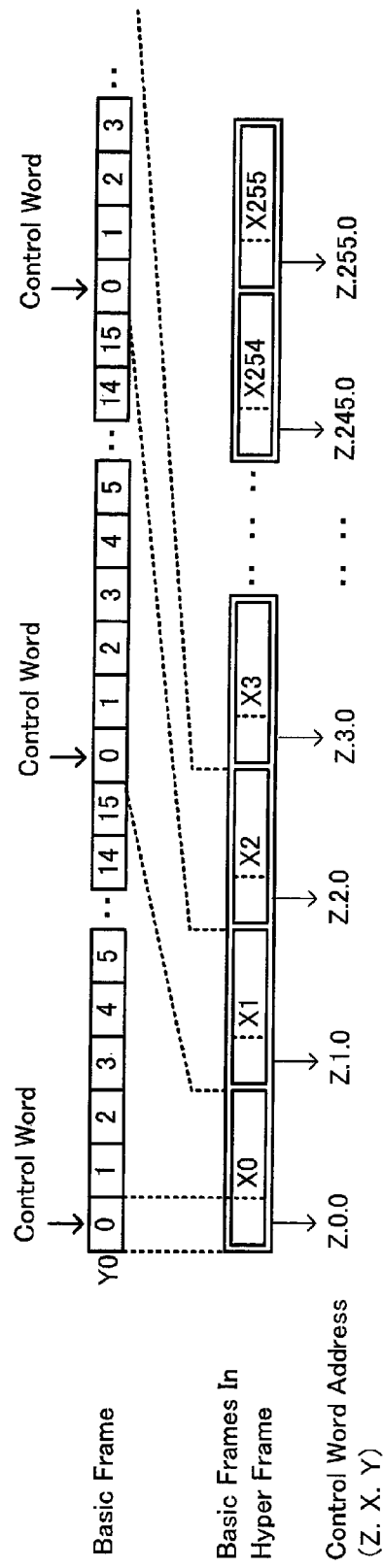
FIG. 13 illustrates control word addresses.
Figure 14:
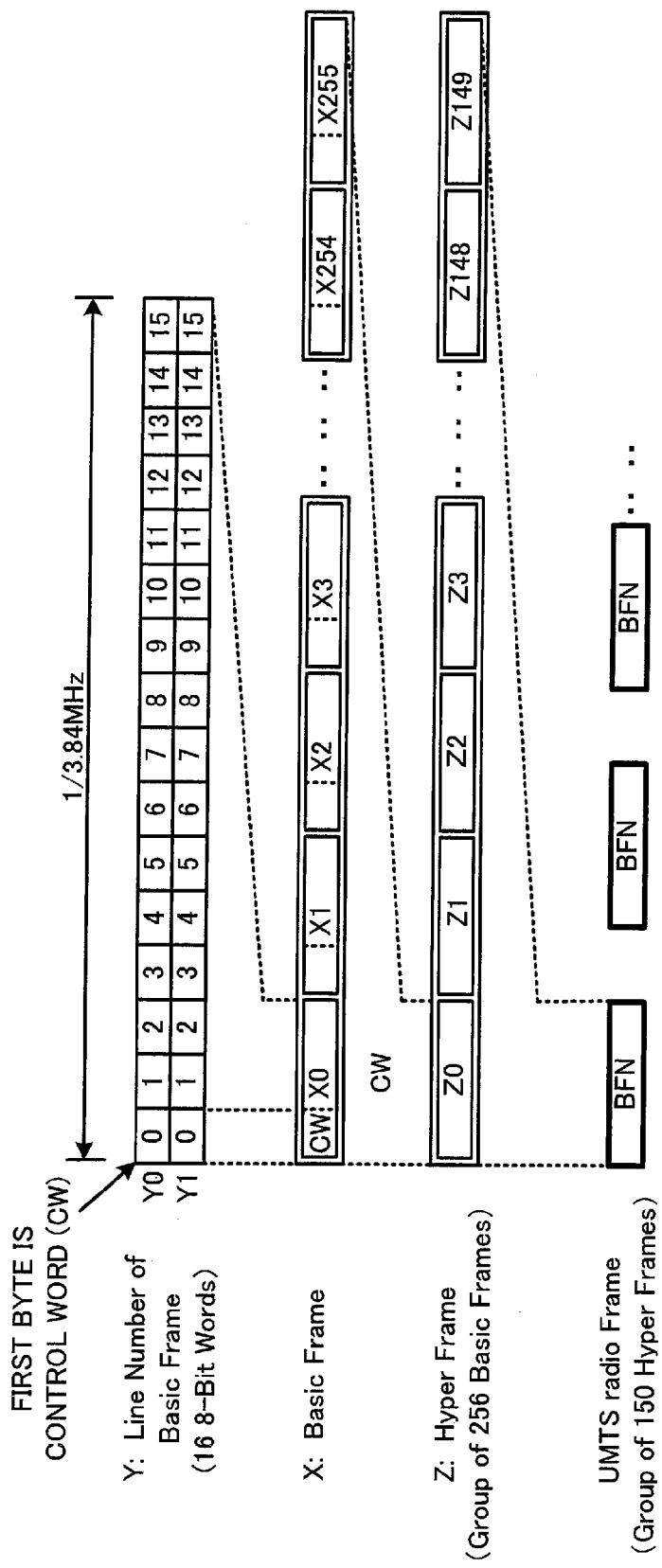
FIG. 14 illustrates a second example of the CPRI frame structure.
Figure 15:
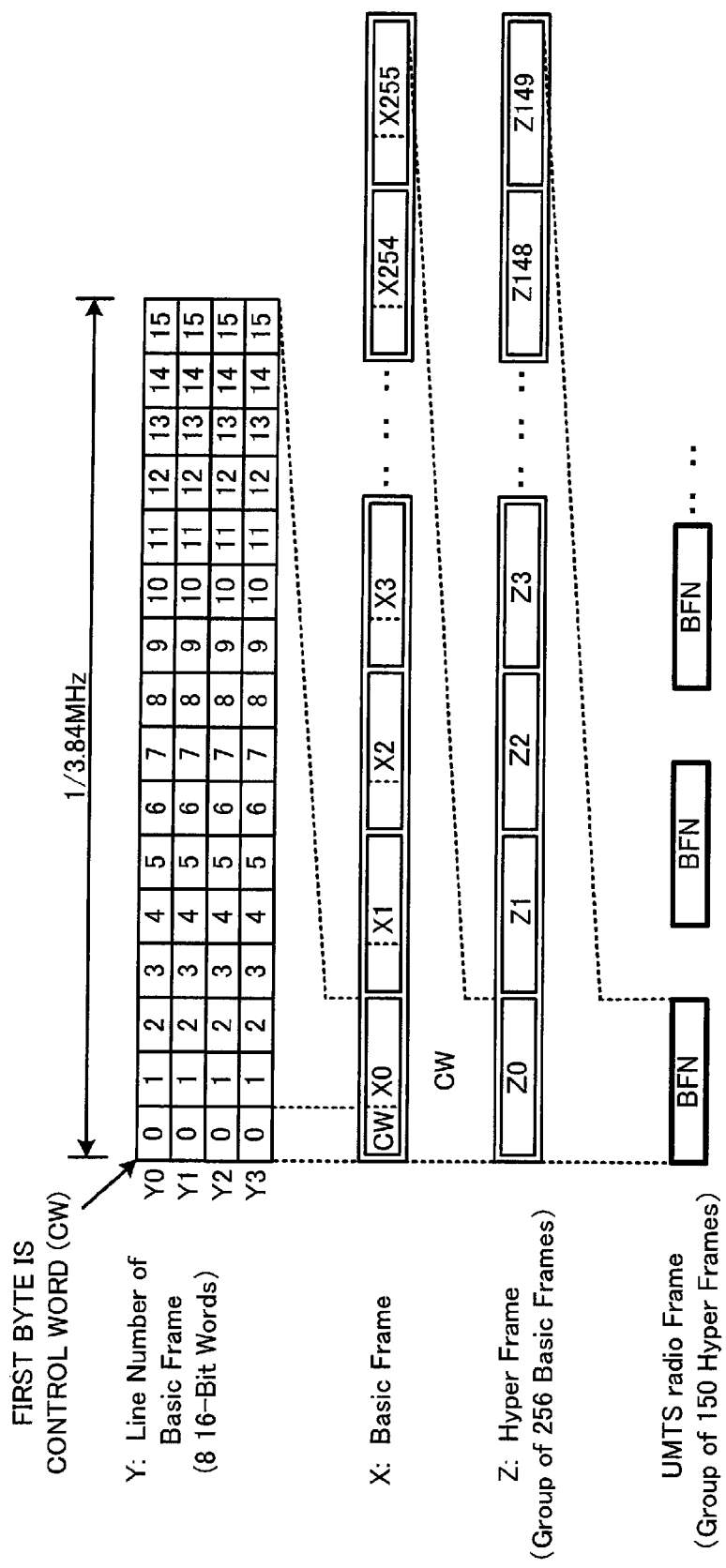
FIG. 15 illustrates a third example of the CPRI frame structure.
Figure 17:
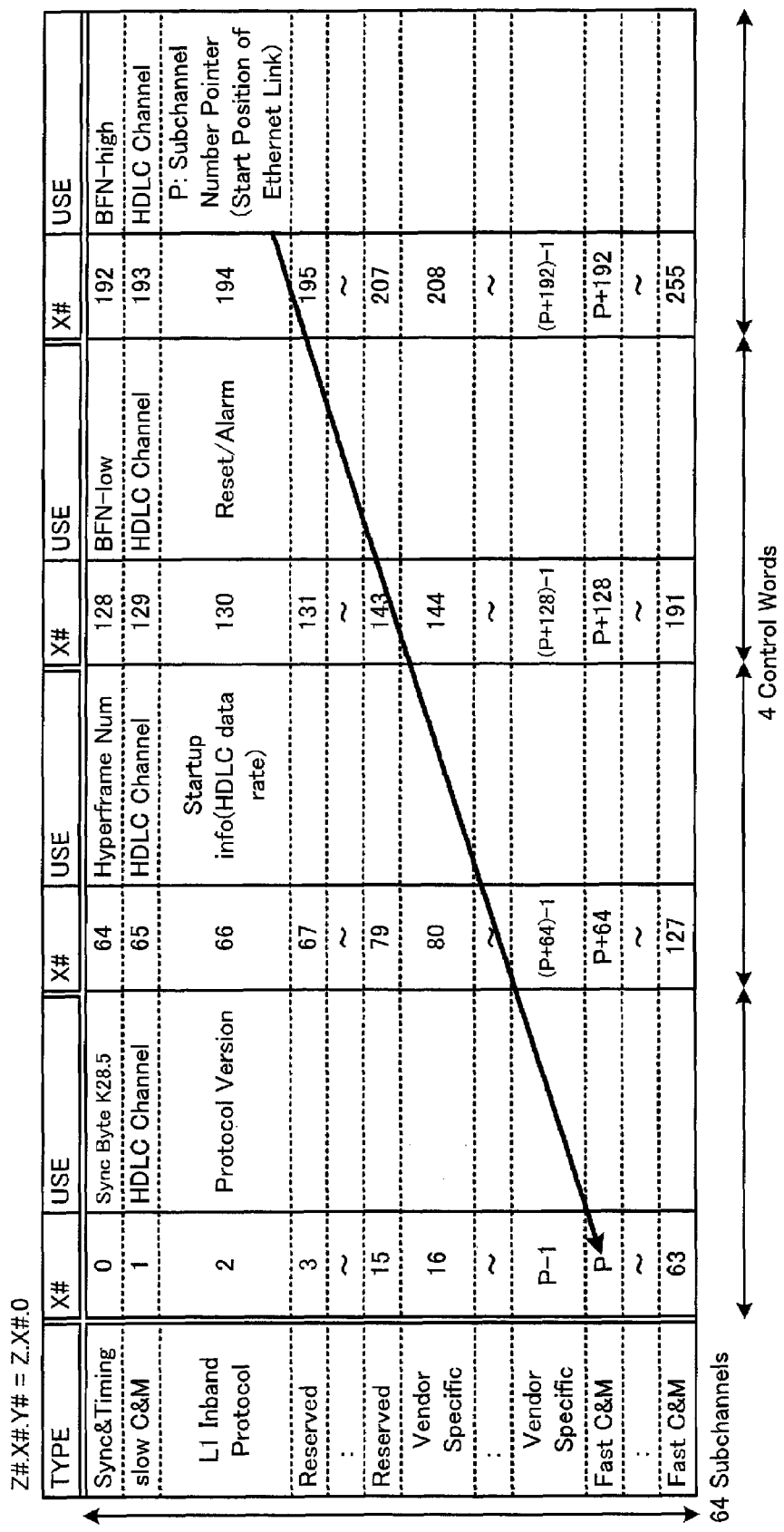
FIG. 17 illustrates control word mapping.
Figure 18:
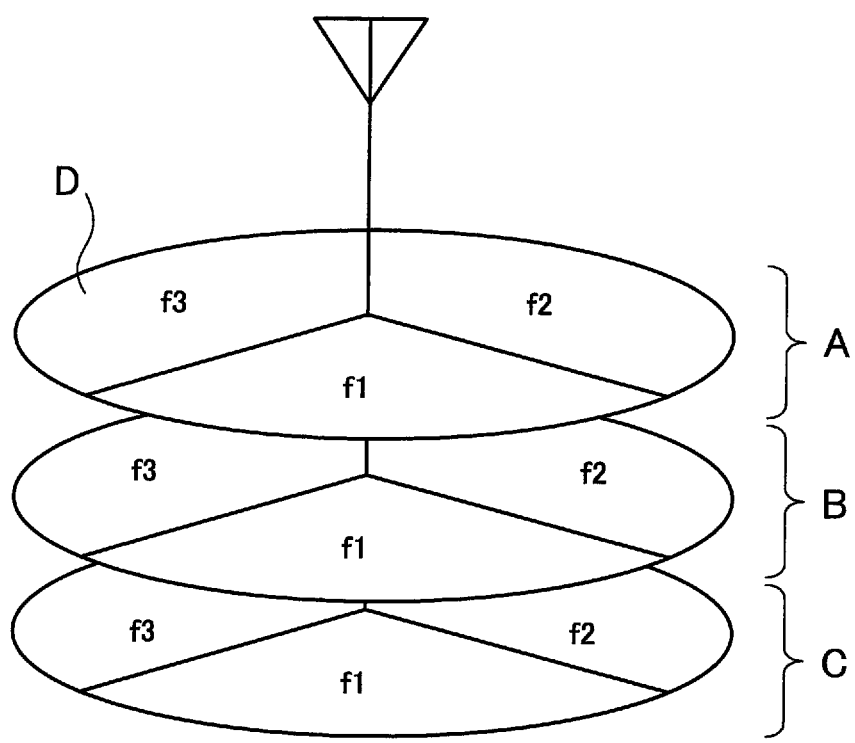
FIG. 18 illustrates sectors and cells for the base station.
Figure 19:
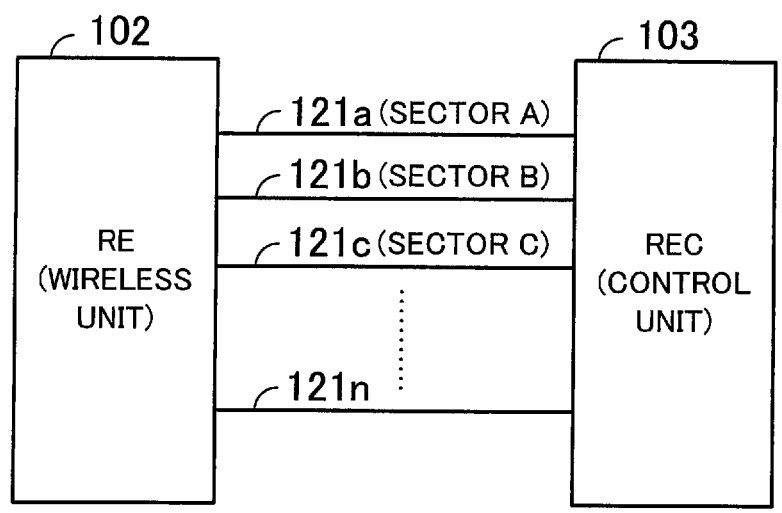
FIG. 19 illustrates the relationship between the sectors and CPRI links.

FIG. 9 is a flowchart illustrating the operation of the base station for downstream data. The base station transfers the downstream data output from the call control unit 22 to the wireless transmitter 13 in the following procedure.

In step S21, the CPRI link terminating unit 21 of the RE 20 receives data from the call control unit 22.

In step S22, the CPRI link terminating unit 21 determines whether the data received from the call control unit 22 need to be divided. For example, the CPRI link terminating unit 21 determines whether the data needs to be divided by comparing the size of the received data with a threshold. The threshold may be the amount of data that can be transferred by a single CPRI link, for instance. When it is determined that the data need to be divided, the procedure goes to step S23. Otherwise, the procedure goes to step S26. Whether to divide the data can also be predetermined in a fixed manner by the operator.

In step S23, the CPRI link terminating unit 21 selects CPRI links 31*a*, 31*b*, 31*c*, . . . , and 31*n* that are used to transfer the division data. The CPRI link terminating unit 21 may select predetermined CPRI links 31*a*, 31*b*, 31*c*, . . . , and 31*n*, or may select all the CPRI links 31*a*, 31*b*, 31*c*, . . . , and 31*n*. Alternatively, the CPRI link terminating unit 21 may select a given number of CPRI links having a small transfer amount among the CPRI links 31*a*, 31*b*, 31*c*, . . . , and 31*n*. The operator can specify a CPRI link selection method.

The CPRI link terminating unit 21 selects one CPRI link to transfer the common control information among the CPRI links 31*a*, 31*b*, 31*c*, . . . , and 31*n*. The CPRI link 31*a*, 31*b*, 31*c*, . . . , or 31*n* can be predetermined or can be selected at random.

In step S24, the CPRI link terminating unit 21 divides the data. The CPRI link terminating unit 21 divides the data by the number of the CPRI links 31*a*, 31*b*, 31*c*, . . . , and 31*n* selected in step S23. For example, if three CPRI links 31*a*, 31*b*, and 31*c* are selected, the data is divided into three parts. The CPRI link terminating unit 21 generates common control information and individual control information.

In step S25, the CPRI link terminating unit 21 transfers the division data, the common control information, and the individual control information by using the CPRI links 31*a*, 31*b*, 31*c*, . . . , and 31*n* selected in step S23. The CPRI link terminating unit 21 transfers the CPRI frame with the common control information and the individual control information placed in vendor-specific areas.

In step S26, the CPRI link terminating unit 11 of the REC 10 receives the data transferred from the CPRI link terminating unit 21.

In step S27, the CPRI link terminating unit 11 determines whether the data needs to be combined. The CPRI link terminating unit 11 determines the necessity to combine the data, depending on whether the common control information is specified in vendor-specific areas of the CPRI frame. If it is determined that the data need to be combined, the procedure goes to step S28. Otherwise, the procedure goes to step S30.

In step S28, the CPRI link terminating unit 11 obtains the common control information from the vendor-specific areas of the CPRI frame and recognizes the target CPRI links 31*a*, 31*b*, 31*c*, . . . , and 31*n* for data combination.

In step S29, the CPRI link terminating unit 11 obtains the individual control information from the CPRI links 31*a*, 31*b*, 31*c*, . . . and 31*n* recognized in step S28. The CPRI link terminating unit 11 restores the original data by combining the division data in accordance with the common control information and the individual control information.

In step S30, the CPRI link terminating unit 11 outputs the restored data to the wireless transmitter 13.

As has been described above, the base station divides the data to be transferred by the CPRI into division data and transfers the division data by a plurality of CPRI links. After being transferred, the original data is restored from the division data.

If the data is concentrated on a CPRI link, the data is transferred by the plurality of CPRI links in a distributed manner. Accordingly, the data transfer efficiency can be improved.

Data transfer by a plurality of CPRI links enables data transfer exceeding the data transfer amount of a single CPRI link, increasing the data transfer amount per sector.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions, and alterations could be made hereto without departing from the spirit and scope of the invention.

What is claimed is:

1. A base station that performs internal data transfer from a first circuit to a second circuit through a plurality of links based on a Common Public Radio Interface (CPRI) interface, the base station comprising:
   a divider that divides data to be transferred through the CPRI links based on the CPRI interface into division data;
   a transmitter that transfers the division data by using the plurality of CPRI links based on the CPRI interface from the first circuit to the second circuit, generates both common restoration information concerning an entire data division for the CPRI links #1, #2, . . . and #n and individual restoration information concerning data division for each of the CPRI links #1, #2, . . . and #n, and transfers both the common restoration information to the second circuit through one of the CPRI links #1, #2, . . . and #n and the individual restoration information to the second circuit using a corresponding CPRI link #1, #2, . . . or #n;
   a receiver that receives the division data transferred by the plurality of CPRI links based on the CPRI interface from the first circuit to the second circuit; and
   a restorer that restores in the second circuit the original data from the received division data based on the common restoration information and the individual restoration information;
   wherein the common restoration information includes an item indicating which of the CPRI links #1, #2, . . . and #n is used to transfer the division data, an item indicating a total amount of data to be transferred, and an item indicating an order in which the division data transferred by the CPRI links #1, #2, . . . and #n is combined;
   and wherein the individual restoration information includes an item indicating a number of division data parts to be connected in each CPRI link and an item indicating a basic frame used to transfer the division data in the each CPRI link.

2. The base station according to claim 1, wherein the transmitter transfers the common restoration information included in vendor-specific information of the CPRI interface.

3. The base station according to claim 2, wherein the restorer determines whether to restore the original data from the division data depending on whether the vendor-specific information includes the common restoration information.

4. The base station according to claim 1, wherein the transmitter transfers the individual restoration information included in vendor-specific information of the CPRI interface.

5. The base station according to claim 4, wherein the restorer restores the original data from the division data that have been transferred by using the basic frame, in accordance with the individual restoration information.

6. A wireless control apparatus of a base station that performs internal data transfer from a first circuit to a second circuit through a plurality of links based on a Common Public Radio Interface (CPRI) interface, the wireless control apparatus comprising:
   a divider that divides data to be transferred through the CPRI links based on the CPRI interface into division data;
   a transmitter that transfers the division data by using the plurality of CPRI links based on the CPRI interface from the first circuit to the second circuit, generates both common restoration information concerning an entire data division for the CPRI links #1, #2, . . . and #n and individual restoration information concerning data division for each of the CPRI links #1, #2, . . . and #n, and transfers both the common restoration information to the second circuit through one of the CPRI links #1, #2, . . . and #n and the individual restoration information to the second circuit using a corresponding CPRI link #1, #2, . . . or #n;
   a receiver that receives the division data transferred by the plurality of CPRI links based on the CPRI interface from the first circuit to the second circuit; and a restorer that restores in the second circuit the original data from the received division data based on the common restoration information and the individual restoration information;

wherein the common restoration information includes an item indicating which of the CPRI links #1, #2, ... and #n is used to transfer the division data, an item indicating a total amount of data to be transferred, and an item indicating an order in which the division data transferred by the CPRI links #1, #2, ... and #n is combined;

and wherein the individual restoration information includes an item indicating a number of division data parts to be connected in each CPRI link and an item indicating a basic frame used to transfer the division data in the each CPRI link.

7. A wireless apparatus of a base station that performs internal data transfer from a first circuit to a second circuit through a plurality of links based on a Common Public Radio Interface (CPRI) interface, the wireless apparatus comprising:

a divider that divides data to be transferred through the CPRI links based on the CPRI interface into division data;

a transmitter that transfers the division data by using the plurality of CPRI links based on the CPRI interface from the first circuit to the second circuit, generates both common restoration information concerning an entire data division for the CPRI links #1, #2, ... and #n and individual restoration information concerning data division for each of the CPRI links #1, #2, ... and #n, and transfers both the common restoration information to the second circuit through one of the CPRI links #1, #2, ... and #n and the individual restoration information to the second circuit using a corresponding CPRI link #1, #2, ... or #n;

a receiver that receives the division data transferred by the plurality of CPRI links based on the CPRI interface from the first circuit to the second circuit; and a restorer that restores in the second circuit the original data from the received division data based on the common restoration information and the individual restoration information;

wherein the common restoration information includes an item indicating which of the CPRI links #1, #2, ... and #n is used to transfer the division data, an item indicating a total amount of data to be transferred, and an item indicating an order in which the division data transferred by the CPRI links #1, #2, ... and #n is combined;

and wherein the individual restoration information includes an item indicating a number of division data parts to be connected in each CPRI link and an item indicating a basic frame used to transfer the division data in the each CPRI link.

8. A data transfer method in a base station that performs internal data transfer from a first circuit to a second circuit through a plurality of links based on a Common Public Radio Interface (CPRI) interface, the data transfer method comprising:

dividing data to be transferred through the CPRI links based on the CPRI interface into division data;

generating both common restoration information concerning an entire data division for the CPRI links #1, #2, ... and #n and individual restoration information concerning data division for each of the CPRI links #1, #2, ... and #n;

transferring the division data by using the plurality of CPRI links based on the CPRI interface from the first circuit to the second circuit and both the common restoration information to the second circuit through one of the CPRI links #1, #2, ... and #n and the individual restoration information to the second circuit using a corresponding CPRI link #1, #2, ... or #n;

receiving the division data transferred by the plurality of CPRI links based on the CPRI interface from the first circuit to the second circuit; and restoring in the second circuit the original data from the received division data based on the common restoration information and the individual restoration information;

wherein the common restoration information includes an item indicating which of the CPRI links #1, #2, ... and #n is used to transfer the division data, an item indicating a total amount of data to be transferred, and an item indicating an order in which the division data transferred by the CPRI links #1, #2, ... and #n is combined;

and wherein the individual restoration information includes an item indicating a number of division data parts to be connected in each CPRI link and an item indicating a basic frame used to transfer the division data in the each CPRI link.

* * * * *